3,193,232
RADIO BRACKET OR HOLDER
Carlos M. Hatcher, 17 Jumping Brook Drive,
Neptune, N.J.
Filed Sept. 5, 1962, Ser. No. 221,593
4 Claims. (Cl. 248—226)

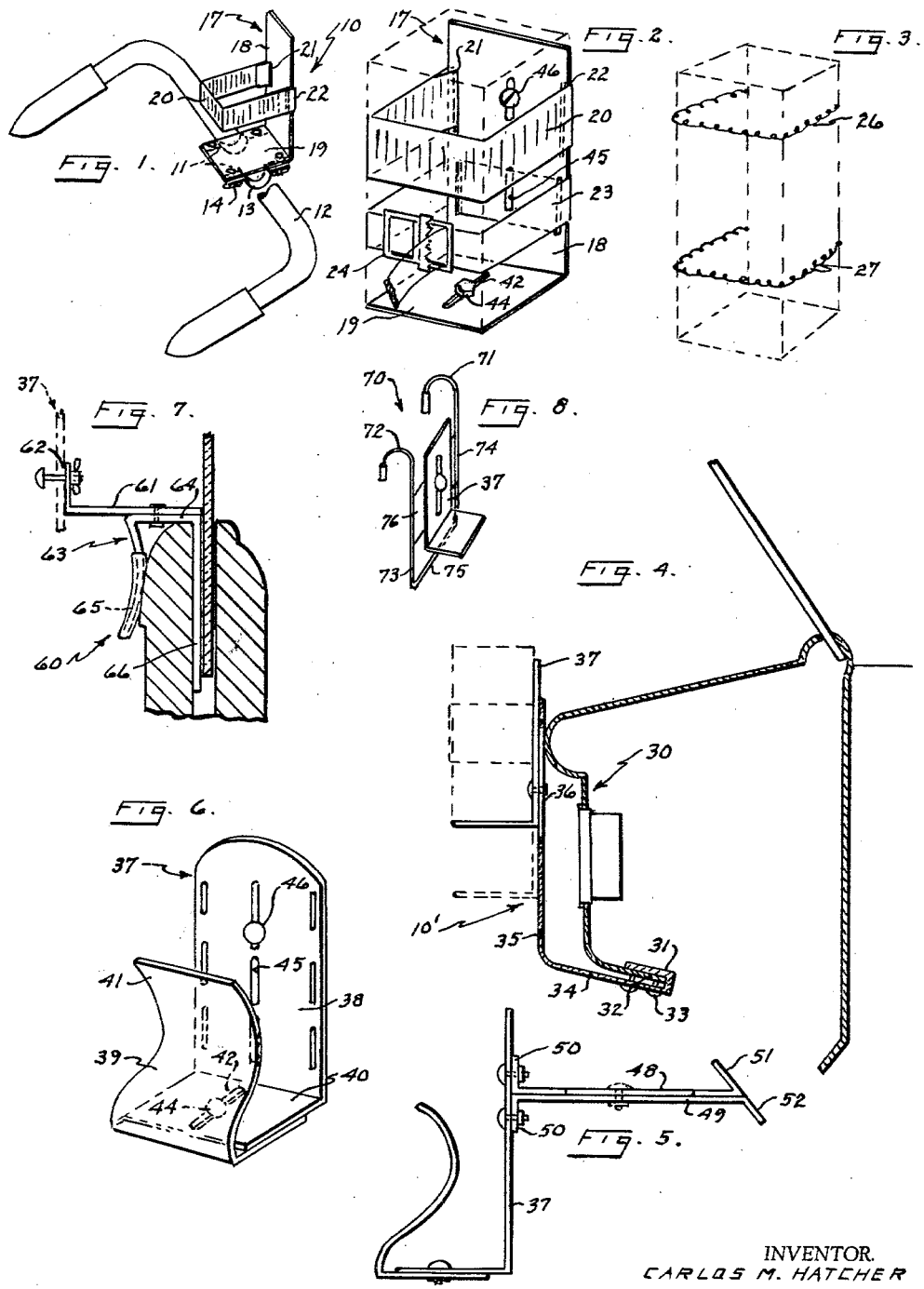

This invention relates to holders or brackets for supporting a small transistor radio and more particularly to a holder or bracket for supporting a transistor radio on an automobile. Transistor radios are today made in a very small rectangular package and are completely self-contained requiring no external connection. It is this type of radio that is intended to be supported by a holder or bracket in an easily accessible position either on a bicycle, tricycle, baby buggy, motor scooter, motorcycle or in an automotive vehicle such as a car or truck as the case may be.

Most of the radios now utilized with automotive vehicles are built into the vehicle and require connection to an outside aerial connection to the potential or electric supply and this type of radio must remain as a fixed part of the vehicle. Many of the portable radios have been utilized with an automotive vehicle. In some instances the portable radio has been inserted in the glove compartment but in this instance the aerial is shielded and it becomes necessary to provide an external aerial. A further attempt has been to utilize a small portable radio resting directly above the dash either being bolted to the dash or utilizing a magnetic holder to retain the radio in position while in use.

It is an object of this invention to provide a holder or bracket for a small self-contained transistor radio in which the holder or bracket is easily attached to the dash of an automotive vehicle and in which the holder or bracket is adjustable to position the transistor radio in a desired position.

It is a further object of this invention to provide a holder or bracket for a small self-contained transistor radio in which the holder or bracket is easily attached to the handlebar of a bicycle, tricycle, baby buggy, motorcycle or motor scooter and in which the holder or bracket is adjustable to position the transistor radio in a desired position.

Other objects of this invention shall be apparent by reference to the accompanying detailed description and the drawings in which FIG. 1 is a perspective view of a handlebar with the holder or bracket in an adjusted position, FIG. 2 is a perspective view of the transistor radio supporting element, FIG. 3 is a further embodiment similar to FIG. 2, FIG. 4 is a cross sectional view of an automotive dash illustrating the transistor radio holder or supporting bracket, FIG. 5 is a side elevational view of a further embodiment similar to FIG. 4, FIG. 6 is a perspective view of a further embodiment of the transistor radio supporting bracket, FIG. 7 is a cross sectional view of a still further embodiment of the holder or bracket, and FIG. 8 is a perspective view of a still further embodiment of this device.

Referring to the drawings there is illustrated in FIG. 1 a transistor radio supporting holder or bracket 10 which includes two clamps 11 used to surround and clamp about the handlebar 12. The two clamps 11 comprise a lower portion 13 held in position by a pair of threaded bolts 14. The upper element of the clamp is the flat portion 19 with four apertures through which bolts 14 pass. The transistor radio holder is formed as an L-shaped bracket 17 with the upstanding portion 18 and base 19. The bolts 14 are securely tightened to retain base 19 and clamps 11 in a fixed relationship to thus support the transistor radio holder 17.

When a transistor radio is mounted on base 19 bearing against the upstanding portion 18, an elastic band, strap or spring 20 is provided that may be stretched to surround the transistor radio and retain the radio in a tight gripping relationship with the holder 17. The band 20 may be attached at both ends to the upstanding portion 18 at either side at slot 21 and at slot 22 as illustrated in FIGS. 1 and 2. The manner of attaching band 20 may be in any standard fashion such as sewing or affixing the band to itself or the band may be a web belt 23 with a buckle 24. In some instances the bracket 17 as shown in FIG. 2 may be mounted on the center post of the bicycle, motorcycle, etc. In this instance a slot 42 is provided in the base portion 19 to allow the post to protrude through the base or to allow a bolt 44 to be inserted through the slot 42 into the central post thus supporting bracket 17 at the center of the handlebars instead of to one side as illustrated in FIG. 1.

A further embodiment of this invention is illustrated in FIG. 3 in which band 20 of FIG. 2 is replaced by a pair of springs 26 and 27. Otherwise the holder is similar in every sense to the embodiment illustrated in FIG. 2.

Referring to FIG. 4 there is illustrated a cross sectional view of an automotive dash or dashboard 30. The dash 30 has a lower lip 32 which may be utilized to support the transistor radio bracket or holder $10^1$. In this embodiment the bracket or holder $10^1$ is provided with a clamp 31 that surrounds the end 32 of the dashboard and may be clamped in position by a pair of bolts 33. The clamp 32 has an extended arm 34 with an angularly positioned extension 35. The angle of the extension 35 is provided to insure a desired vertical supporting position for the transistor radio holder. The extension 35 may be of a desired length as illustrated in FIG. 4 and the extension 35 may be provided with a central slot 36 to permit mounting a transistor radio holder 37. The holder 37 illustrated in FIG. 6 may be comprised of two elements, an L-shaped bracket 38 and a bracket 39 provided with a base to match the base 40 of bracket 38 and provided with a springy or resiliently formed lip 41. Brackets 39 and 38 are retained in an adjusted position by means of a pair of slots 42 in bracket 38 and 39 with an attaching bolt 44 to retain brackets 38 and 39 in an adjusted clamped position. Bracket 38 is also provided with slots 45 in the upstanding back portion of the bracket so that by means of a bolt or bolts 46, the bracket 37 may be mounted as illustrated in FIG. 4. The transistor radio holder or bracket illustrated in FIG. 2 may also be provided with a slot or slots 45 and a bolt 46 and this further form of holder may be similarly used with the upstanding arm 35 as shown in FIG. 4. One of the reasons for the elongated slots 45 in the holder 37 and the slot 36 in arm 35 is to permit adjusting the position of the holder 37 so that the transistor radio is high enough with relation to the windshield of the car to permit the radio to receive the incoming radio beam. With the radio lowered, the metal portion of the dash tends to obstruct the reception of radio waves to the radio.

Referring to FIG. 5 there is illustrated a further embodiment of the supporting bracket. In some of the cars the angle of the dashboard may vary and the particular form of attaching the bracket varies. As illustrated in FIG. 5 there are two supporting brackets 48 and 49 in which bracket 48 is provided with a 90° extension 50 with an aperture for bolting to the radio holder 37. The opposite end of bracket 48 is provided with a larger degree angle extension 51 generally dictated by the angle of the automobile dash as now designed. The lower bracket 49 may be similar and may be bolted to bracket 48 or it may be an extendable bracket with an angle end 50 for bolting to the holder 37. Its opposite end is provided with an angle 52 greater than the 90° and also dictated by the angle now provided by the average dash. These angles are arbitrary and may be increased or decreased to provide the brackets 48 and 49 in a horizontal position as illustrated in FIG. 5. The ends 51 and 52 are generally provided with apertures to permit securing to the dashboard by means of self-threading screws or bolts as desired.

Referring to FIG. 7 there is illustrated a still further embodiment of this invention in which the same holder 37 illustrated in FIG. 6 may be supported by a bracket 60. In this instance, bracket 60 is designed to fit over and into the space between the glass and the window frame. Bracket 60 is comprised of a top element 61 positioned horizontally with an angular extension 62 having an aperture therein for attaching holder or bracket 37 as already described. The top element 61 is welded or secured to a lower element 63. Element 63 is provided with a horizontal portion 64 to mate with the upper element 61 and be welded or secured in position as illustrated in FIG. 7. An extension 66 is approximately at right angles to the portion 64 and extends between the glass and the door as illustrated. At the inner end of the portion 64 there is a resilient lip portion 65 which may be sprung sufficiently to position the bracket as illustrated and the resilient element 65 will tightly clamp the supporting bracket 60 as illustrated. Arms 66 and 65 may be provided with a sponge rubber covering or cloth covering to prevent marring the finish of the door or any similar walled area surface as in a boat, this will assist in obtaining a better frictional grip for the bracket 60.

Referring to FIG. 8 there is illustrated a still further embodiment of this invention in which the transistor radio holder or support illustrated in FIG. 6 or the support illustrated in FIG. 2 may be utilized with a bracket 70. Bracket 70 is comprised of a pair of hook shaped elements 71 and 72. The hook shaped elements are provided with elongated shanks 73 and 74. The shanks are connected by a cross piece 75. This complete structure may be formed out of a single bar. A cross piece 76 is affixed between the shanks 73 and 74 and is provided with an aperture and bolt at its center. The bolt is the same bolt 46 shown in FIGS. 2 and 6. Thus the holder 37 may be supported by this bracket over a door or side of the car or any similar walled area as in a boat. The hook shaped ends 71 and 72 may be bendable or extendable resiliently to encompass the variations in width of the wall or supporting structure and the ends of the hook shaped portions 71 and 72 may be provided with pads to prevent marring the surface that they frictionally grip.

Although the transistor radio has been singled out as the particular object intended to be supported, the holder or bracket may be utilized for other purposes such as supporting a box or pocket for small objects or supporting a book, pads, maps and similar objects. It is to be noted that although the holder or bracket has been designed for use in connection with the handlebar of a bicycle, tricycle, baby buggy, motorcycle or motor scooter and has been designed for mounting to the dashboard or a window of an automotive vehicle, the holder may be similarly utilized or mounted in various other positions such as about the house over a chair or any other object to retain the radio in a desired position. The brackets may be bent to provide a desirable angle for the particular mounting and the brackets may be adjustable for the clamping according to the supporting structure without departing from the spirit of this invention and this invention shall be limited only by the appended claims.

What is claimed is:

1. An attachment for supporting a transistor radio comprising an L-shaped holder, which includes a base, an upright back and holding element and in which said L-shaped holder is supported in a fixed position by a pair of abutting brackets in which said brackets are provided with means at one end to attach to said upright back of said L-shaped holder and are provided with angularly bent portions at the opposite end to mate and abut with and be affixed to an angular face of a supporting structure.

2. In a device according to claim 1 in which said holding element is an elastic band.

3. In a device according to claim 1 in which said holding element is a spring.

4. An attachment for supporting a transistor radio comprising an L-shaped holder, which includes a base, an upright back and holding element and in which said L-shaped holder is provided with elongated slots in the upright portion of said holder and in which a generally L-shaped bracket having two legs is provided for attachment by one leg to the upright portion of the L-shaped holder for the transistor radio and by the other leg to a U-shaped clamp to fit the lower edge of an automobile windowframe, said U-shaped clamp provided with two legs, one leg of the U-shaped clamp being adapted to be inserted between the window and the door while the other leg of the U-shaped clamp is adapted to bear against the surface of the door.

References Cited by the Examiner

UNITED STATES PATENTS

| | | | |
|---|---|---|---|
| 1,222,246 | 4/17 | Schumacker | 248—103 |
| 2,319,109 | 5/43 | Bullock | 248—295 X |
| 2,547,620 | 4/51 | Capano | 206—41 X |
| 2,550,200 | 4/51 | Murrell | 248—214 |
| 2,632,618 | 3/53 | Griglak | 248—311 |
| 2,686,032 | 8/54 | Thorson | 248—211 |
| 2,914,285 | 11/59 | Audette | 248—226 |
| 2,920,853 | 1/60 | Bufogle | 248—214 |
| 2,921,766 | 1/60 | Bauer | 248—226 |
| 2,936,992 | 5/60 | Browning | 248—313 X |
| 3,027,014 | 3/62 | Lindblom | 248—214 X |
| 3,071,338 | 1/63 | Kaufman | 248—43 |

CLAUDE A. LE ROY, *Primary Examiner.*

FRANK L. ABBOTT, *Examiner.*